(12) United States Patent
Yamauchi et al.

(10) Patent No.: US 6,873,428 B1
(45) Date of Patent: Mar. 29, 2005

(54) DATA COMMUNICATION APPARATUS

(75) Inventors: Takashi Yamauchi, Osaka (JP);
Kenichi Takahashi, Toyohashi (JP);
Kenichi Morita, Toyohashi (JP);
Keisuke Hashimoto, Toyokawa (JP);
Kenichi Sawada, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 696 days.

(21) Appl. No.: 09/627,964

(22) Filed: Jul. 28, 2000

(30) Foreign Application Priority Data

Aug. 2, 1999 (JP) ............................................ 11-218912

(51) Int. Cl.$^7$ ................................................ H04N 1/00
(52) U.S. Cl. .................. 358/1.15; 358/434; 379/100.06
(58) Field of Search ................................ 358/1.15, 434, 358/435, 436, 438, 439; 379/100.01, 100.06, 100.12

(56) References Cited

U.S. PATENT DOCUMENTS 5,585,854 A * 12/1996 Makino ....................... 358/407
6,335,966 B1 * 1/2002 Toyoda .................. 379/100.06

FOREIGN PATENT DOCUMENTS

| JP | 10-304173 A | 11/1998 |
| JP | 11-088640 A | 3/1999 |
| JP | 11-112775 A | 4/1999 |

* cited by examiner

Primary Examiner—Thomas D. Lee
(74) Attorney, Agent, or Firm—Sidley Austin Brown & Wood LLP (57) ABSTRACT

The data communication apparatus of the present invention includes a CPU, operation panel, reading unit, image memory for storing read image data, resolution converter for converting stored image data to an optional resolution, telephone communication unit for transmitting data over a telephone line, network communication unit for transmitting data over an internet line, and a printing unit. The resolution converter converts fine detail data to low detail data and sends the low detail data to the telephone communication unit when transmitting data over the telephone line. In this way data reception reliably occurs simultaneously with data transmission. Thereafter, when fine detail request data including resolution data are received over the telephone line, the data are converted to the desired resolution, and sent to the network communication unit. In this way the apparatus attains excellent operationality since fine detail data are transmitted only as necessary.

19 Claims, 8 Drawing Sheets

DATA COMMUNICATION APPARATUS

The present application claims priority to Japanese Patent Application No. 11-218912 filed Aug. 2, 1999, the entire content of which is hereby incorporated by reference.

BACKGROUND OF THE INVENTION

1. Field of the Invention

The present invention relates to a data communication apparatus, and specifically relates to a data communication apparatus such as an internet facsimile apparatus and the like for performing facsimile communications over an internet line.

2. Description of the Related Art

In data communication apparatuses for transmitting data using a telephone line such as facsimile apparatuses and the like, the problem of poor operationality arises relating to the time and transmission cost incurred when transmitting large amounts of data due to the small line capacity of the telephone line.

For this reason even though a document image generally is read at fine detail, i.e., a high resolution of 600 dpi, the data actually are transmitted as low detail data after conversion to data of, for example, low resolution of 200 dpi.

Since only the culled data are transmitted at low resolution, however, the obtained high resolution image data are not used, which is extremely wasteful. In particular, the receiving side may desire to receive the high resolution (fine detail) data, not the low resolution data.

In view of this situation, the rapid popularization in recent years of internet facsimile apparatuses capable of sending and receiving data not only over telephone line by also using an internet line has led to the idea of transmitting large amounts of fine detail data using an internet line. This idea provides excellent transmission speed and cost perspectives when transmitting large amounts of data because an internet line is a large capacity line compared to a telephone line.

On the other hand, although data are transmitted using an internet line in such internet facsimile apparatuses, a new disadvantage arises inasmuch as a sender cannot know when data are received because data reception does not occur at the same time as data transmission.

Accordingly, there is the further inconvenience that even when the fine detail data are transmitted by the sending side, the reliable reception of the fine detail data cannot be immediately confirmed.

Moreover, there are also instances when fine detail data are unnecessary and low detail data are adequate on the receiving side, but the receiving side desires reliable reception simultaneously with the transmission by the sending side, and in such instances also the transmission of fine detail data over an internet line is more inconvenient.

SUMMARY OF THE INVENTION

An object of the present invention is to provide a data communication apparatus having excellent operationality for reliably transmitting data which are simultaneously received by the receiving side.

Another object of the present invention is to provide a data communication apparatus capable of reliably receiving data simultaneously with the transmission of the data, and transmitting fine detail data as necessary.

These and other objects are attained by a data communication apparatus comprising: an image reader for reading a document image and outputting image data; a memory for storing image data output from said image reader; a first transmission device for transmitting image data over a telephone line based on image data stored in said memory; a receiving device for receiving a request data relating to data transmitted by said first transmission device; and a second transmission device for transmitting image data over an internet line based on the request data.

These objects are further attained by a data communication apparatus comprising: a first receiving device for receiving image data over a telephone line; a second receiving device for receiving image data over an internet line; and a transmission device for sending a request data to a transmission origin to request data reception over the telephone line in response to reception by the first reception device.

According to the present invention, first, data are reliably received on the receiving side simultaneously with the data transmission since the data are transmitted over the telephone line. Then, data are transmitted over the internet line when necessary only when a request data has been received. Accordingly, it is possible to provide a data communication apparatus having better operationality.

The data communication apparatus desirably also includes a resolution converter for converting the resolution of the stored data, such that the telephone line transmission unit transmits the data after the stored data have been converted to lower resolution.

Since the data transmitted over the telephone line is low resolution (low detail) data in this instance, the disadvantages of transmission speed and cost when using the telephone line are reduced.

It is further desirable that, in the data communication apparatus, the data request data includes resolution data, such that the internet line transmission device transmits data after the data have been converted to a resolution specified in the received resolution data by the resolution conversion unit.

In this way the data transmitted over the internet line is data at a resolution specified by the request from the receiving side. Accordingly, large amounts of data in excess of requirements are not transmitted, and it is possible to provide a data communication apparatus having better operationality.

The invention itself, together with further objects and attendant advantages, will be best understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
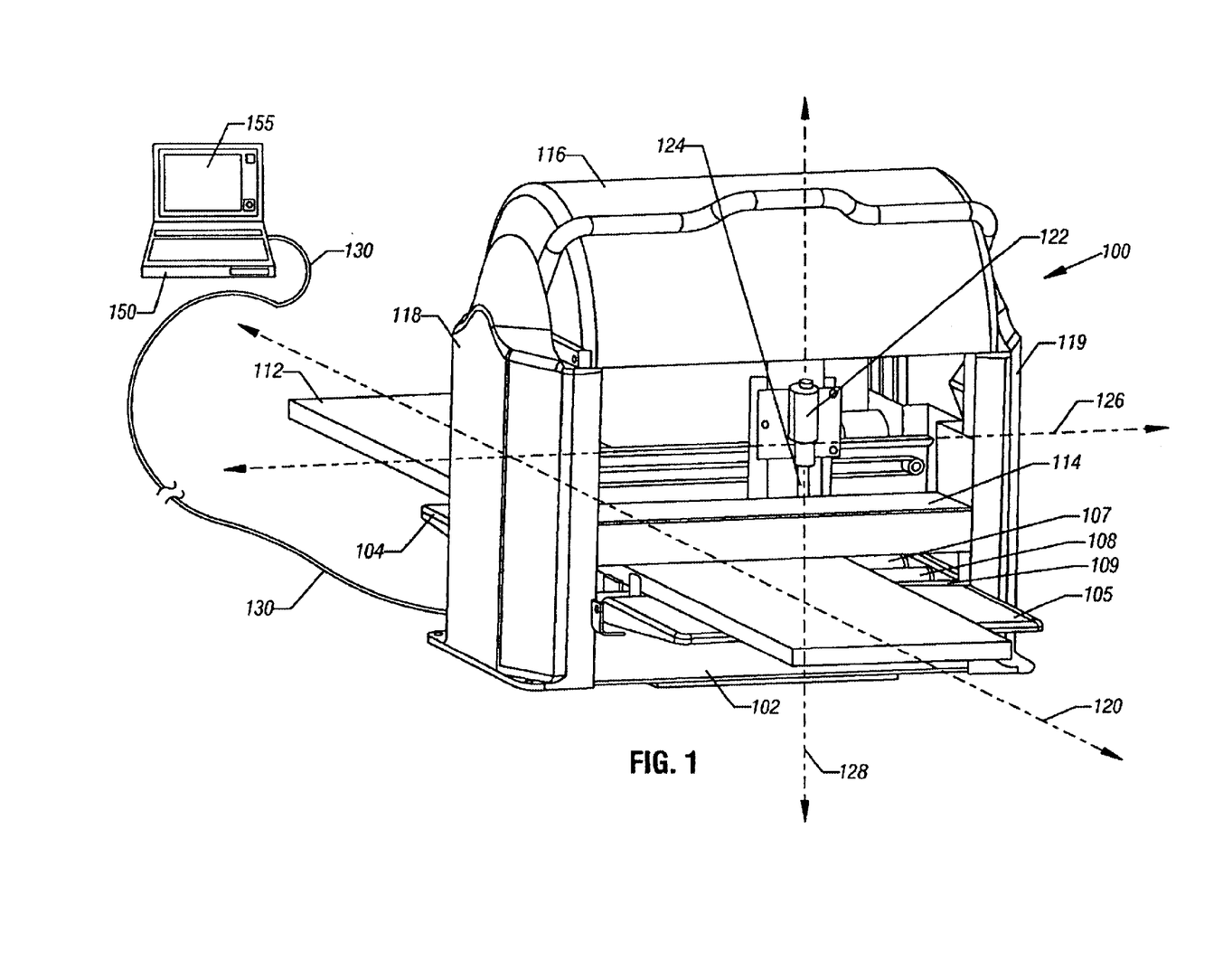
FIG. 1 is an exterior view of an internet facsimile apparatus of an embodiment of the present invention.

The embodiments of the present invention are described hereinafter with reference to the accompanying drawings. FIG. 1 shows an exterior view of the internet facsimile apparatus of an embodiment of the present invention. Referring to the drawing, the internet facsimile apparatus 1 is provided with a document feed tray 101 for supplying a document image for transmission, document discharge tray 103 for discharging a read document image, recording sheet feed tray 107 for supplying a recording sheet to print out received data, recording sheet discharge tray 105 for discharging printed recording sheets, and an operation panel 109 for operating the internet facsimile apparatus 1.

Figure 2:
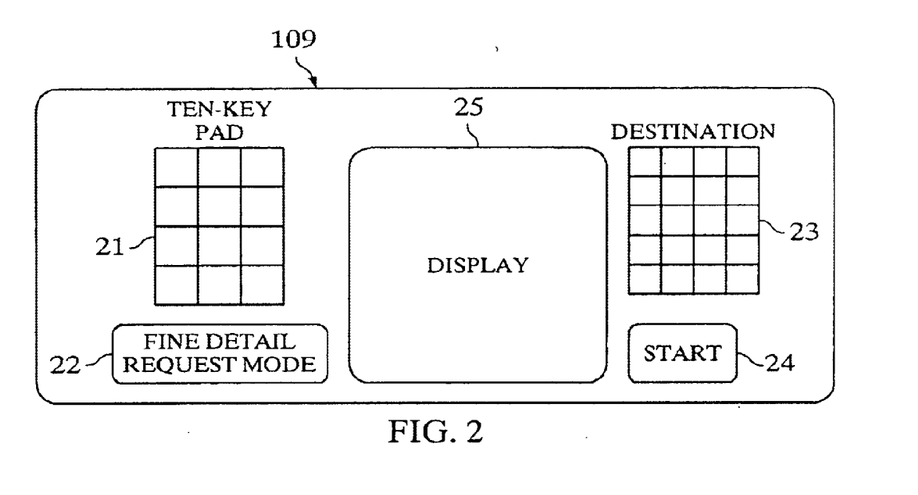
FIG. 2 is a top view of the operation panel 109 shown in FIG. 1.

FIG. 2 shows a top view of the operation panel 109 of FIG. 1. The operation panel 109 includes a ten-key pad 21 used for inputting transmission destinations and address recording, a fine detail request mode key 22 for requesting fine detail data as necessary during facsimile reception over the telephone line, destination selection keys 23 for selecting a transmission destination by operating one of the keys, a start key 24 for starting data transmission, and a display unit 25 for displaying messages for the user. The fine detail request mode key 22 is lighted when the fine detail request mode is set using an automatic lighting method.

Figure 3:
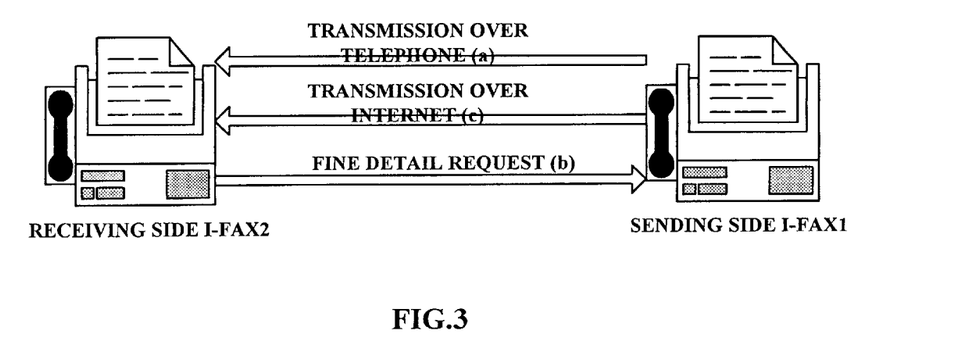
FIG. 3 shows a usage example of an internet facsimile apparatus of the embodiment of the present invention.

The mode of use of the internet facsimile apparatus of the embodiment of the present invention is shown in FIG. 3. As shown in the drawing, the internet facsimile apparatus 1 is connected to an internet facsimile apparatus 2 via a telephone line and an internet line, and data transmission and reception is accomplished over these lines.

In this instance, first, the internet facsimile apparatus 1 transmits low detail data to the internet facsimile apparatus 2 over the telephone line (arrow (a)). Then, the internet facsimile apparatus 2, which has received the low detail data over the telephone line, sends fine detail request data to the internet facsimile apparatus 2 over the same telephone line (arrow (b)). Next, the internet facsimile apparatus 1, which has received the fine detail request data, transmits fine detail data to the internet facsimile apparatus 2 over the internet line (arrow (c)).

When the internet facsimile apparatus 2 on the receiving side considers that fine detail request data are unnecessary, the fine detail request data are not transmitted, and the fine detail data are not transmitted from the internet facsimile apparatus 1 to the internet facsimile apparatus 2 over the internet line.

Figure 4:
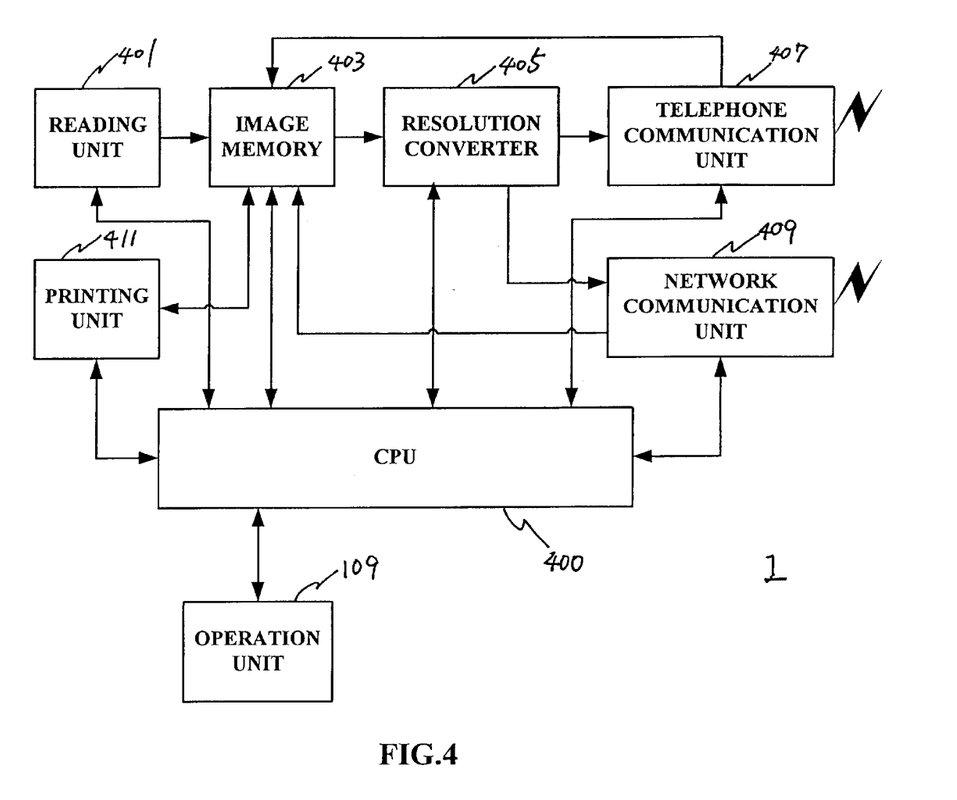
FIG. 4 is a block diagram briefly showing the general structure of an internet facsimile apparatus of the embodiment of the present invention.

FIG. 4 is a block diagram briefly showing the general structure of the internet facsimile apparatus 1 of an embodiment of the present invention. The internet facsimile apparatus 1 includes a CPU 400 for overall control of the apparatus, an operation unit (operation panel) 109 for specifying and recording transmission destinations, a reading unit 401 for reading a document image at a specified resolution, an image memory 403 for storing image data read by the reading unit 401, a resolution converter 405 for converting the data stored in the image memory 403 to an optional resolution, a telephone communication unit 407 for sending and receiving data over the telephone line, a network communication unit 409 for sending and receiving data over the internet line, and a printing unit 411 for outputting the data received by the network communication unit 409 or the telephone communication unit 407 at a specified resolution.

When data are transmitted over the telephone line, the resolution converter 405 culls the data read by the reading unit 401, i.e., fine detail data of, for example, 600 dpi, to low detail data of, for example, 200 dpi, and sends the low detail data over the telephone line. On the other hand, when fine detail request data including resolution data are received by the telephone communication unit 407, the fine detail data are converted to the specified resolution, e.g., 400 dpi, and transmitted to the network communication unit 411.

Figure 5:
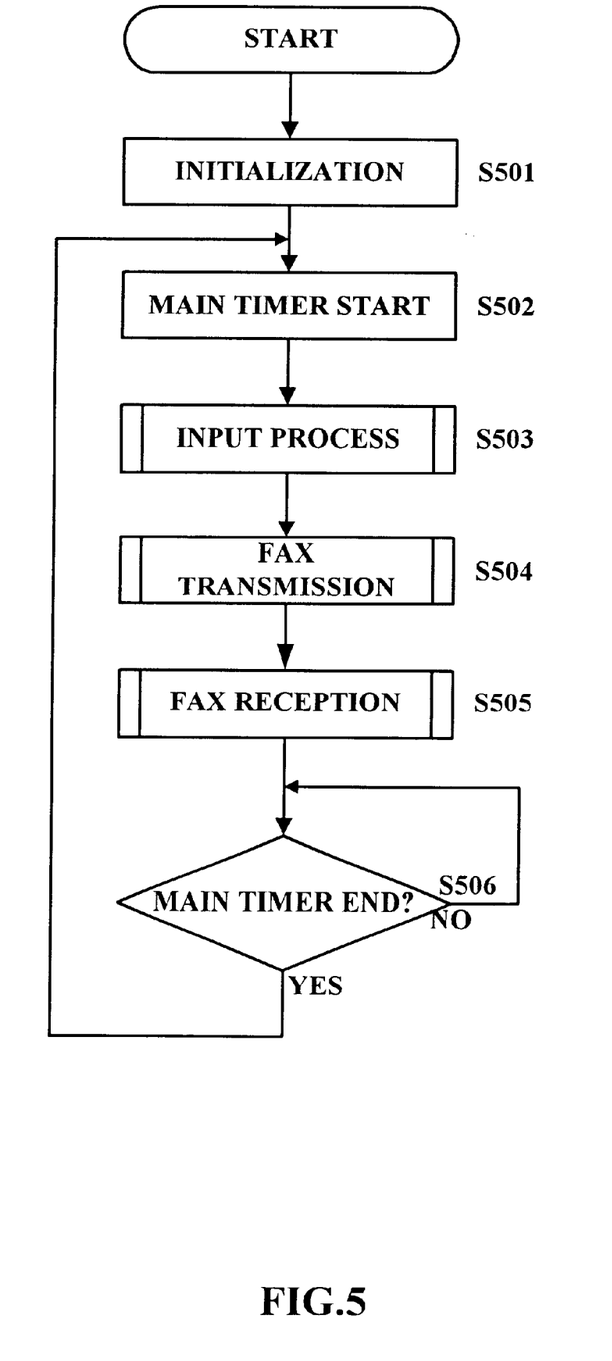
FIG. 5 is a flow chart showing the main routine of the CPU 400 of the internet facsimile apparatus.

FIG. 5 is a flow chart showing the main routine of the CPU 400 of the internet facsimile apparatus 1. Referring to FIG. 5, in the CPU 400 of the internet facsimile apparatus 1, first, the timers and set mode and the like necessary for the apparatus are initialized in step S501. Then, in step S502, the main timer is started to time the waiting time for repeating the main routine.

Next, in step S503, the input process for data transmission is executed, and in step S504, the data transmission (facsimile transmission) process for actually transmitting data is executed.

In step S505, reception of fine detail request data from the receiving side or normal data reception (facsimile reception) is accomplished. That is, when fine detail request data relative to the data transmitted in step S504 have been transmitted from the receiving side, the fine detail request data reception process is executed by the telephone communication unit 407. When the normal data transmission is received by the network communication unit 409 or the telephone communication unit 407, the normal data reception (facsimile reception) process is executed. Then, if nor further transmission is coming, the routine advances to step S506.

In step S506, the end of the timer started in step S502 is awaited. When the previously set time is attained and the timer ends, the routine returns to step S502, and the series of processes (steps S502–S506) are repeated again.

Figure 6:
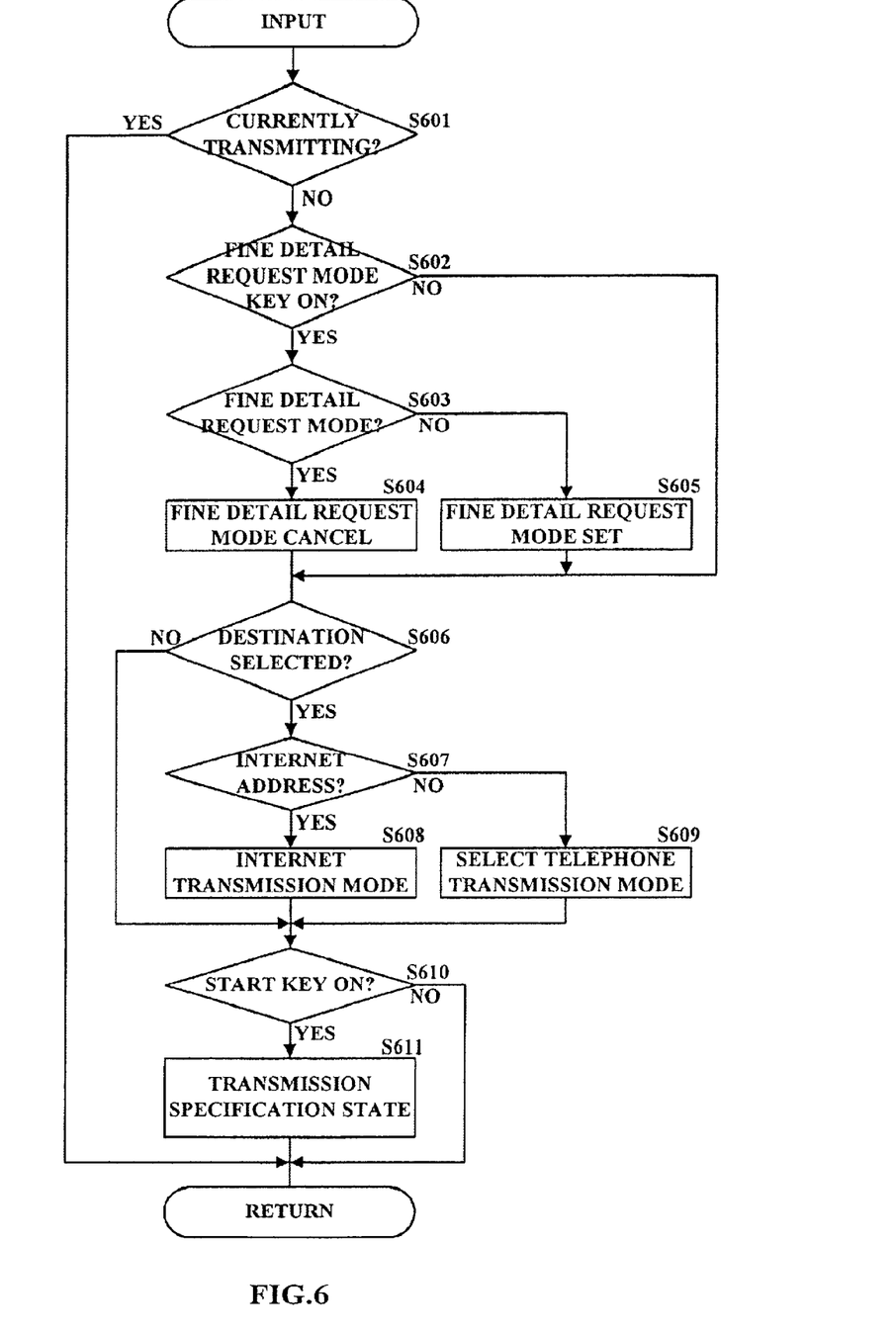
FIG. 6 is a flow chart showing the input process (step S503) subroutine of FIG. 5.

FIG. 6 is a flow chart showing the input process (step S503) of FIG. 5. Referring to FIG. 6, the input process first determines in step S601 whether or not the apparatus itself is currently transmitting, and if not currently transmitting, a determination is made in step S602 as to whether or not the fine detail request mode key 22 is turned ON.

When it is determined that the fine detail request mode key 22 is not turned ON, the process advances to step S606, whereas when it is determined that the fine detail request mode key 22 is turned ON, a check is made in step S603 to determine whether or not the apparatus itself is set in the fine detail request mode at the moment key 22 was turned ON (i.e., before being turned ON), that is, a determination is made as to whether or not the fine detail request mode key 22 is lighted.

Then, when the fine detail request mode has been set at the moment the key 22 is turned ON, the fine detail request mode is cancelled in step S604, whereas if the fine detail request mode has not been set, the fine detail request mode is set in step S605.

Then, in step S606, a determination is made as to whether or not a destination has been selected by operating the destination selection keys 23. When it is determined that a destination has not been selected, the process advances to step S610, whereas when a destination has been selected, a determination is then made in step S607 as to whether or not this destination is an internet address.

If the selected destination is an internet address, the [internet transmission mode] for transmitting data over the internet line is selected in step S608, and if the selected destination is a telephone number, the [telephone transmission mode] for transmitting data over the telephone line is selected in step S609.

When the start key 24 is turned ON in step S610, the transmission specification state is entered in step S611, and the subroutine ends.

Figure 7:
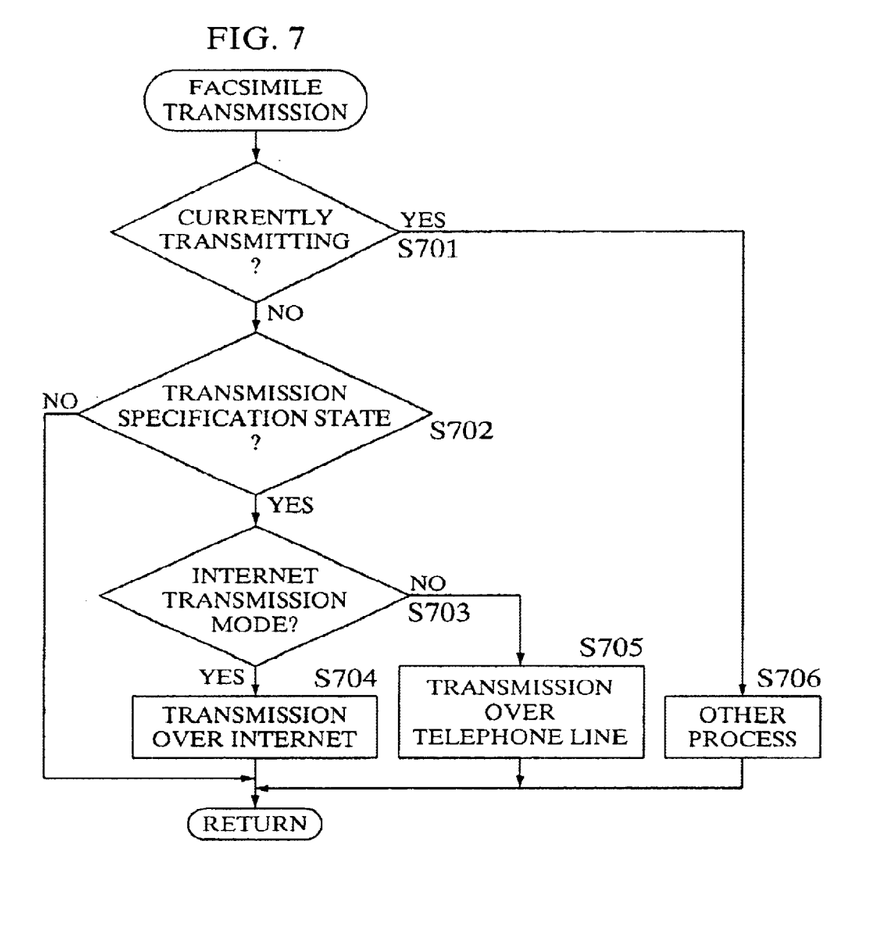
FIG. 7 is a flow chart showing the facsimile transmission process (step S504) subroutine of FIG. 5.

FIG. 7 is a flow chart showing the facsimile transmission process (step S504) subroutine of FIG. 5. Referring to FIG. 7, the facsimile transmission process first, in step S701, determines whether or not the apparatus itself is currently transmitting, and if not currently transmitting, a determination is made in step S702 as to whether or not there are transmission specifications.

If currently transmitting, other processes for real-time transmission over the telephone line are executed in step S706.

When it is determined that there are transmission specification in step S702, i.e., when the start key 24 has been turned ON in step S610 and the apparatus is in the transmission specification state in step S807 of FIG. 8 described later, then in step S703 a determination is made as to whether or not these specifications set data transmission over an internet line via the network communication unit 409, i.e., whether or not the [internet transmission mode] is set.

When it is determined that the [internet transmission mode] is set, the data transmission process over the internet by the network communication unit 409 is started in step S704.

On the other hand, when it is determined that the [telephone transmission mode] for data transmission over the telephone line by the telephone communication unit 407 is set in step S703, the process of transmitting data over the telephone line by the telephone communication unit 407 is started in step S705.

Figure 8:
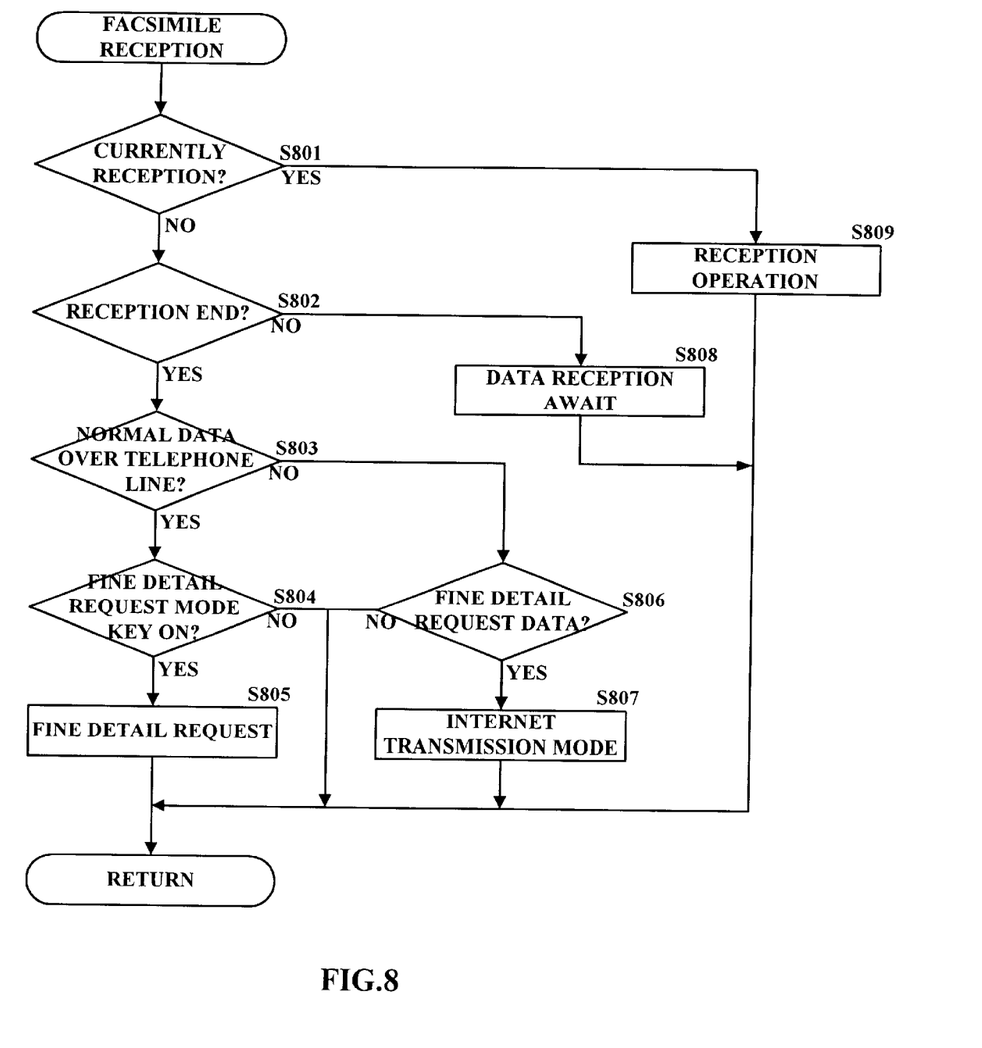
FIG. 8 is a flow chart showing the facsimile reception process (step S505) subroutine of FIG. 5.

FIG. 8 is a flow chart showing the facsimile reception process (step S505) subroutine of FIG. 5. Referring to FIG. 8, the facsimile reception process first determines whether or not the apparatus itself is currently receiving in step S801, and if the apparatus is currently receiving, the routine advances to step S809 and the reception operation continues directly.

If the apparatus is not currently receiving, the reception end timing is checked in step S802. That is, a check is made to determine whether or not reception has ended at the present moment to check whether or not the received data are fine detail request data over the telephone line.

When it is determined that reception has not ended in step S802, data reception is awaited in step S808. Then, if data are not received within the set waiting time, the subroutine ends and the process returns to the main routine.

On the other hand, when it is determined that reception has ended in step S802, a determination is made in step S803 as to whether or not the received data are normal data over the telephone line (i.e., data other than the fine detail request data).

Then, when it is determined that the received data are normal data over the telephone line, a check is made in steep S804 to determine whether or not the fine detail request mode key 22 is turned ON. That is, in this step it is determined whether or not there is a request to transmit fine detail data relative to the received normal data.

When key 22 has been tuned ON, in step S805, the fine detail request data are sent to the transmitting side in step S805. Conversely, when it is determined that the fine detail request mode key 22 is not turned ON, the subroutine ends and the process returns to the main routine.

When it is determined that the data receive at the destination are not normal data over the telephone line in step S803, in step S806 a check is made to determine whether or not the received data are fine detail request data over the telephone line.

When it is determined that fine detail request data have been received from the transmission destination over the telephone line, in step S807, the [internet transmission mode] is set, and internet transmission is specified based on the resolution data included in the fine detail request data. Conversely, when it is determined that fine detail request data have not been received, the subroutine ends and the process returns to the main routine.

The aforesaid processes are summarized below. If the apparatus itself is currently receiving data, the reception process continues. Then, when reception ends, a check is made to determine whether or not the received data are fine detail request data over the telephone line.

If the received data are fine detail request data, resolution data corresponding to the request are transmitted to the transmission destination over the internet line. Conversely, when the data received over the telephone line are normal data, the fine detail request mode key 22 is turned ON only when reception of high resolution (fine detail) data is desired relative to these normal data.

According to the internet facsimile apparatus 1 of an embodiment of the present invention as described above, when data are received, first, low detail data at low resolution are transmitted over the telephone line. Accordingly data reception on the receiving side can occur simultaneously with the data transmission. Furthermore, reliable data reception can be confirmed on the transmission side.

Fine detail request data including a desired resolution are send back to the transmission side from the reception side only when the receiving side which has received the low resolution data desires to receive fine detail data. Accordingly, fine detail data are not unnecessarily transmitted over the internet line, and the wasteful time and cost required for mutual unnecessary transmission and reception is avoided.

Furthermore, the transmission side which has received a fine detail request can reliably transmit data converted to the desired resolution to the reception side. Accordingly, there is improvement of the inconvenient use of the internet line when it is unknown if fine detail transmission is desired, thereby all the more improving the operationality of the internet facsimile apparatus.

Although the present embodiment has been described only in terms of converting the data stored in the image memory 403 to low resolution data, the present invention is not limited to this arrangement. For example, when resolution data are not included in the fine detail request data from the reception side, the data may be transmitted without changing the resolution of the image data.

All aspects of the embodiment of the present disclosure has been described by way of examples, and is not to be considered as limited to these examples. The scope of the present invention is described by the scope of the claims rather than the foregoing description, and includes meanings equivalent to the scope of the claims and all modifications within the claims.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A data communication apparatus, comprising:
   a memory for storing data;
   a first transmission device for transmitting data over a first line based on data stored in the memory;
   a receiving device for receiving request data relating to the data transmitted by the first transmission device; and
   a second transmission device for transmitting data over a second line based on the request data, said second line being different from the first line.

2. A data communication apparatus according to claim 1, further comprising:
   a resolution converter for converting the resolution of the data stored in said memory.

3. A data communication apparatus according to claim 2, wherein
   said first transmission device transmits data after the data stored in said memory have been converted to lower resolution.

4. A data communication apparatus according to claim 3, wherein
   the request data includes resolution data.

5. A data communication apparatus according to claim 4, wherein
   said resolution converter converts the data stored in said memory to a resolution specified in the resolution data.

6. A data communication apparatus according to claim 5, wherein
   the second transmission device transmits the data after the data stored in said memory have been converted to the resolution specified in the resolution data.

7. A data communication apparatus according to claim 1, wherein
   the first line includes a telephone line.

8. A data communication apparatus according to claim 1, wherein
   the second line includes an internet line.

9. A data communication apparatus, comprising:
   an image reader for reading a document image and outputting image data;
   a memory for storing image data output from said image reader;
   a first transmission device for transmitting image data over a telephone line based on image data stored in said memory;
   a receiving device for receiving request data relating to the data transmitted by said first transmission device; and
   a second transmission device for transmitting image data over an internet line based on the request data.

10. A data communication apparatus according to claim 9, further comprising:
    a resolution converter for converting the resolution of the data stored in said memory.

11. A data communication apparatus according to claim 10, wherein
    said first transmission device transmits data after the data stored in said memory have been converted to lower resolution.

12. A data communication apparatus according to claim 11, wherein
    the request data includes resolution data.

13. A data communication apparatus according to claim 12, wherein
    said resolution converter converts the data stored in said memory to a resolution specified in the resolution data.

14. A data communication apparatus according to claim 13, wherein
    said second transmission device transmits data after the data stored in said memory have been converted to the resolution specified in the resolution data.

15. A data communication apparatus, comprising:
    a first receiving device for receiving image data over a telephone line;
    a second receiving device for receiving image data over an internet line; and
    a transmission device for sending a request data to a transmission origin to request data reception over the internet line in response to reception by the first reception device.

16. A data communication apparatus according to claim 15, wherein
    the request data include a resolution data.

17. A data communication apparatus according to claim 15, wherein
    said transmission device sends a request data over a telephone line.

18. A data communication apparatus according to claim 15, further comprising:
    setting means for setting a mode in which request data is returned in response to reception by said first reception device.

19. A data communicating method for communicating between a first data communicating apparatus and a second data communicating apparatus via a first line and a second line being different from the first line, the method comprising the steps of:
    the first data communicating apparatus transmitting first image data to the second data communicating apparatus via the first line;
    the second data communicating apparatus transmitting a request for second image data related to the first image data; and
    the first data communicating apparatus transmitting the second image data to the second data communicating apparatus via the second line responsive to receiving the request.

* * * * *

UNITED STATES PATENT AND TRADEMARK OFFICE
CERTIFICATE OF CORRECTION

PATENT NO.    : 6,873,428 B1                                            Page 1 of 1
DATED         : March 29, 2005
INVENTOR(S)   : Takashi Yamauchi et al.

It is certified that error appears in the above-identified patent and that said Letters Patent is hereby corrected as shown below:

Drawings,
Sheet 4, FIG. 4, please delete FIG. 4 and add new FIG. 4 below.

FIG. 4

Signed and Sealed this

Twenty-first Day of June, 2005

JON W. DUDAS
*Director of the United States Patent and Trademark Office*